(12) United States Patent
Uchihara

(10) Patent No.: US 12,217,649 B2
(45) Date of Patent: Feb. 4, 2025

(54) DISPLAY DEVICE, DISPLAY CONTROL SYSTEM, AND METHOD FOR CONTROLLING DISPLAY DEVICE

(71) Applicant: CANON KABUSHIKI KAISHA, Tokyo (JP)

(72) Inventor: Masato Uchihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 17/700,580

(22) Filed: Mar. 22, 2022

(65) Prior Publication Data

US 2022/0309992 A1 Sep. 29, 2022

(30) Foreign Application Priority Data

Mar. 24, 2021 (JP) .................. 2021-050040

(51) Int. Cl.
*G09G 3/20* (2006.01)
*G06F 3/01* (2006.01)
*G06T 7/70* (2017.01)

(52) U.S. Cl.
CPC ........... *G09G 3/2092* (2013.01); *G06F 3/013* (2013.01); *G06T 7/70* (2017.01); *G09G 2340/0407* (2013.01); *G09G 2340/0464* (2013.01); *G09G 2354/00* (2013.01); *G09G 2360/04* (2013.01)

(58) Field of Classification Search
CPC .............. G06F 2111/18; G06F 3/0481; G06F 3/04817; G06F 9/4443; G06F 3/04847; G06F 11/3664; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 8,681,256 B2 | 3/2014 | Sako | |
| 9,182,598 B2 | 11/2015 | Sako | |
| 9,846,304 B2 | 12/2017 | Sako | |
| 11,847,715 B2 | 12/2023 | Nakata | |
| 2004/0207743 A1* | 10/2004 | Nozaki | H04N 23/61 348/333.12 |

(Continued)

FOREIGN PATENT DOCUMENTS

| | | | |
|---|---|---|---|
| CN | 106303353 A | * | 1/2017 |
| JP | 2008-096867 A | | 4/2008 |

(Continued)

OTHER PUBLICATIONS

Dec. 3, 2024 Japanese Official Action in Japanese Patent Appln. No. 2021-050040.

*Primary Examiner* — Yingchun He
(74) *Attorney, Agent, or Firm* — Venable LLP

(57) ABSTRACT

A head-mounted display includes: an imaging device; and at least one processor and/or at least one circuit which function as: a detecting unit configured to detect a target subject in images captured by the imaging device; an acquiring unit configured to acquire an image capturing the target subject from an external apparatus; and a display control unit configured to display an image acquired from the external apparatus based on the detection result of the detecting unit.

18 Claims, 9 Drawing Sheets

(56) References Cited

U.S. PATENT DOCUMENTS

| | | | |
|---|---|---|---|
| 2009/0089822 A1* | 4/2009 | Wada | H04H 60/56 |
| | | | 725/10 |
| 2010/0020185 A1 | 1/2010 | Sako et al. | |
| 2010/0085462 A1 | 4/2010 | Sako | |
| 2014/0152688 A1 | 6/2014 | Sako | |
| 2015/0268471 A1 | 9/2015 | Sako | |
| 2018/0067313 A1 | 3/2018 | Sako | |
| 2020/0082629 A1* | 3/2020 | Jones | G02B 27/0172 |
| 2021/0258496 A1 | 8/2021 | Yoshida | |
| 2021/0264620 A1* | 8/2021 | Ramasamy | G06T 7/246 |
| 2021/0303846 A1* | 9/2021 | Yoneyama | G06N 3/063 |
| 2022/0230400 A1 | 7/2022 | Nakata | |
| 2022/0245899 A1 | 8/2022 | Sha et al. | |
| 2022/0309992 A1* | 9/2022 | Uchihara | G06F 3/011 |

FOREIGN PATENT DOCUMENTS

| | | |
|---|---|---|
| JP | 2010-034788 A | 2/2010 |
| JP | 2010-157960 A | 7/2010 |
| JP | 2013-141272 A | 7/2013 |
| JP | 2015-185896 A | 10/2015 |
| JP | 2020-077951 A | 5/2020 |
| JP | 2021-018575 A | 2/2021 |

* cited by examiner

FIG. 13

| A: TIME | B: DETECTION RESULT OF TARGET SUBJECT | C: FACE DETECTION RESULT OF TARGET SUBJECT | D: SIZE DETERMINATION RESULT OF TARGET SUBJECT | E: REPRODUCED IMAGE |
|---|---|---|---|---|
| T0: | OK | OK | OK | IMAGE CAPTURED BY HMD |
| T1: | OK | OK | OK | IMAGE CAPTURED BY HMD |
| T2: | OK | OK | OK | IMAGE CAPTURED BY HMD |
| T3: | OK | OK | OK | IMAGE CAPTURED BY HMD |
| T4: | OK | OK | OK | IMAGE CAPTURED BY HMD |
| T5: | NG | NG | NG | IMAGE ACQUIRED FROM SHARED SERVER |
| T6: | NG | NG | NG | IMAGE ACQUIRED FROM SHARED SERVER |
| T7: | NG | NG | NG | IMAGE ACQUIRED FROM SHARED SERVER |
| T8: | OK | NG | NG | IMAGE ACQUIRED FROM SHARED SERVER |
| T9: | OK | OK | OK | IMAGE CAPTURED BY HMD |
| T10: | OK | OK | OK | IMAGE CAPTURED BY HMD |
| .. | .. | .. | .. | .. |

DISPLAY DEVICE, DISPLAY CONTROL SYSTEM, AND METHOD FOR CONTROLLING DISPLAY DEVICE

BACKGROUND OF THE INVENTION

Field of the Invention

The present invention relates to a head-mounted display, a display control system, an information processing apparatus and a method for controlling the head-mounted display.

Description of the Related Art

In recent years, such techniques as augmented reality (AR) and mixed reality (MR) are used for head-mounted displays which can be mounted on the head of a user, and for smartphones and tablet terminals with cameras.

In a head-mounted display (HMD), a display is disposed directly in front of the eyes of the user, whereby useful information is provided in accordance with the usage scene, and the user can experience a deeper sense of immersion.

A user wearing the HMD can share images captured by a plurality of imaging devices. For example, Japanese Patent Application Publication No. 2013-141272 discloses a technique to display an image of a specific external imaging device on the local display device by specifying position information, camera specification information, and the like, to specify the specific imaging device.

However, the operation to specify an imaging device to share images while watching an event or the like is troublesome, and the user may have difficulty in focusing on the event.

SUMMARY OF THE INVENTION

An object of the present invention is to provide a display device that reduces the load on the user to share the images from various viewpoints in real-time.

A head-mounted display of the present invention includes: an imaging device; and at least one processor and/or at least one circuit which function as: a detecting unit configured to detect a target subject in images captured by the imaging device; an acquiring unit configured to acquire an image capturing the target subject from an external apparatus; and a display control unit configured to display an image acquired from the external apparatus based on the detection result of the detecting unit.

Further features of the present invention will become apparent from the following description of exemplary embodiments with reference to the attached drawings.

BRIEF DESCRIPTION OF THE DRAWINGS

FIG. 13 is a table for describing estimation of a missed period.

DESCRIPTION OF THE EMBODIMENTS

Embodiment 1

A head-mounted display (HMD) according to the present embodiment is an optical see-through type HMD using a transparent display, for example. In the case of the optical see-through type HMD, the user can visually recognize both an image display and incident light from the outside. In other words, the user can visually recognize various information which the HMD displays on the display, while watching such events as a concert or athletic meet by see-through.

The HMD of the present embodiment is assumed to be an optical see-through type HMD, but may be a video see-through type HMD using an opaque display. The video see-through type HMD captures images of the outside world as video, and electrically combines the video with images of a virtual world, and displays combined images.

The HMD can display information on a subject on which the user is focusing (hereafter "target subject") on the display. The information on the target subject is, for example, images captured by imaging apparatuses installed on other HMDs. By mutually transmitting/receiving images captured by the respective HMD using a communication function, users wearing HMDs can share part of a respective visual field in real-time.

The HMDs may transmit/receive images via a shared server. The shared server is a computer that can communicate with a plurality of HMDs, and is equivalent to an information processing apparatus. A display control system according to the present invention includes a shared server and a plurality of HMDs, an implements the sharing of images among HMDs via the shared server.

The HMD acquires images capturing a target subject, which the user sets, from other HMDs. The HMD displays the acquired images at a display position at a display size, so as to avoid interfering with viewing the subject by see-through.

Figure 1:
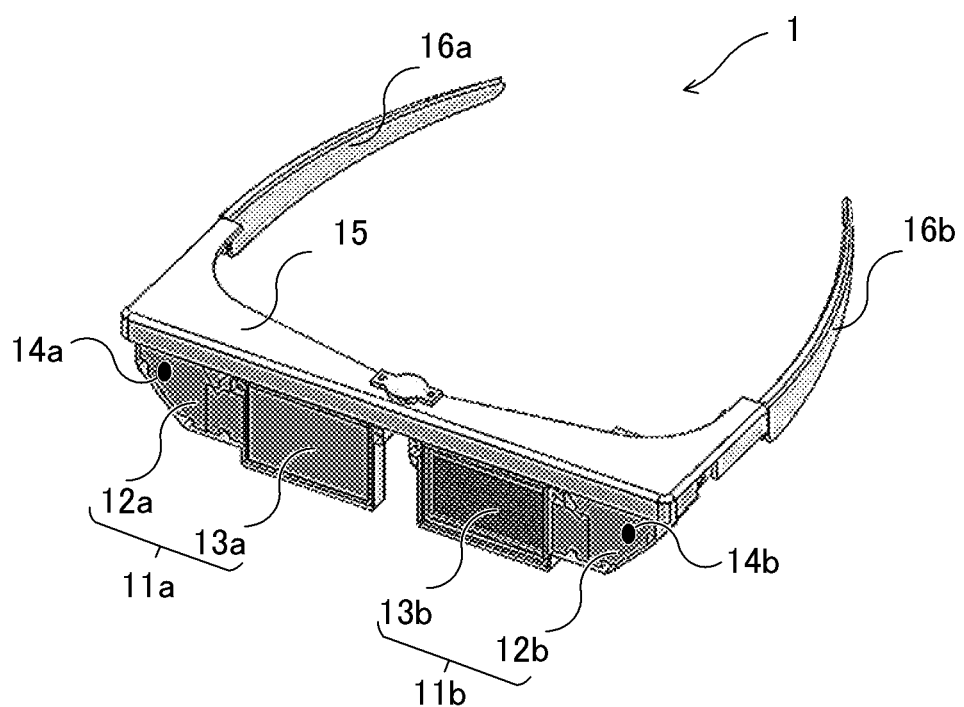
FIG. 1 is an external view of an HMD.

A preferred embodiment of the present invention will be described with reference to the drawings. First an HMD (display device) according to the present invention will be described with reference to FIG. 1. FIG. 1 is an external view of an HMD1. In the following description, the HMD1 is assumed to be an optical see-through type HMD, but may be a video see-through type HMD which uses an opaque display. In the case of the video see-through type HMD, the incident light from the front side is imaged and displayed.

The HMD1 includes a frame and two display units 11a and 11b. The frame includes a rim 15 and temples 16a and 16b are bonded to both sides of the rim 15 respectively. The display units 11a and 11b are bonded to one surface of the rim 15.

An image projection device 12a and a light-guiding device 13a guide light from a display element (not illustrated) of the display unit 11a to a right eye of the user (wearer) wearing the HMD1. In the same manner, an image projection device 12b and a light-guiding device 13b guide light from a display element (not illustrated) of the display unit 11b to a left eye of the wearer wearing the HMD1.

The wearer can perceive both images displayed on the display unit 11a and the display unit 11b and an incident light from the front side of the HMD1 simultaneously. The HMD1 includes an imaging device 14a and an imaging device 14b. The imaging device 14a and the imaging device 14b capture images of the surroundings, including an area to the front of the HMD1.

Figure 2:
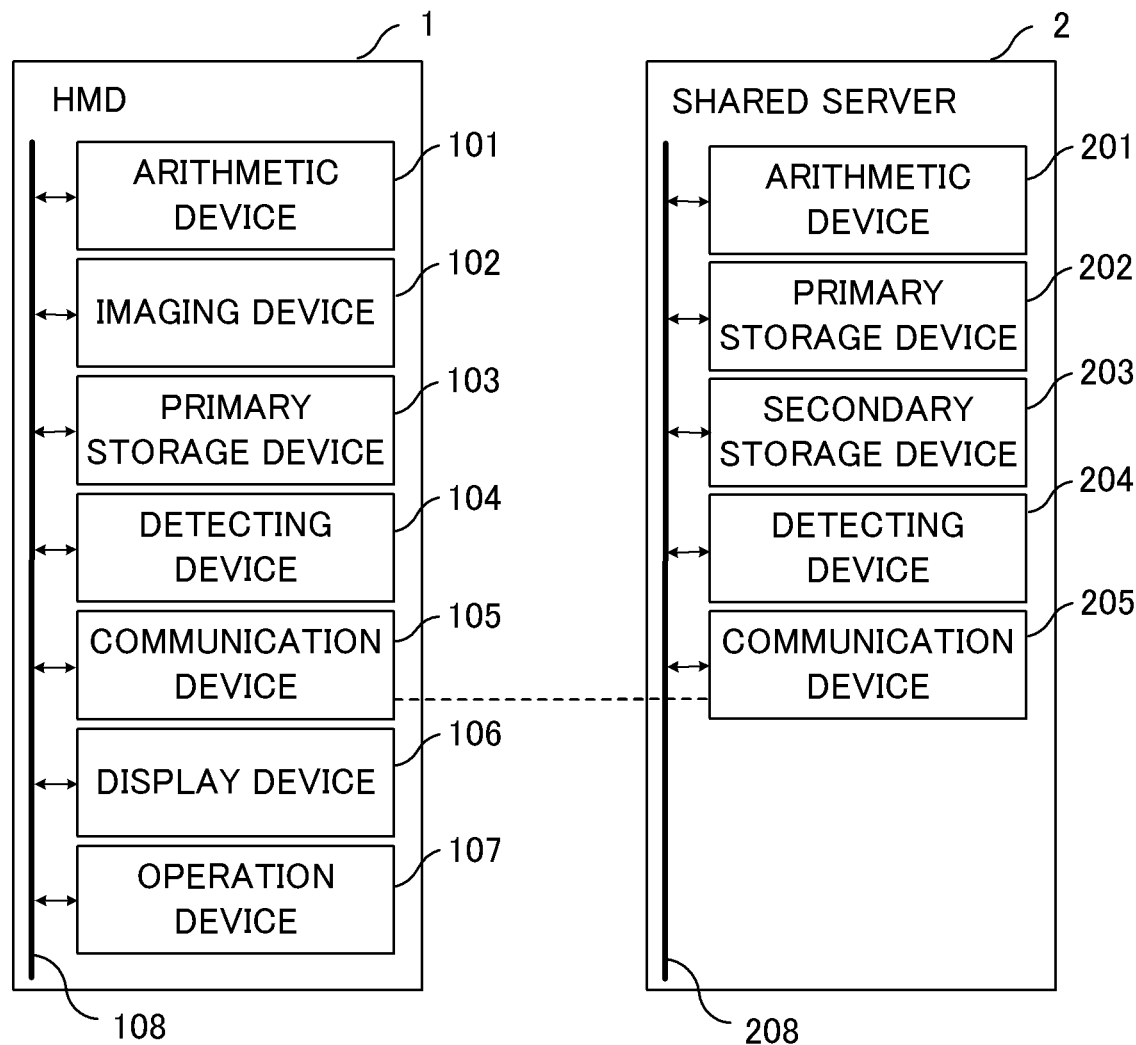
FIG. 2 is a diagram exemplifying hardware configurations of the HMD and a shared server.

Hardware configuration: Hardware configurations of the HMD1 and a shared server 2, which are included in the display control system, will be described with reference to FIG. 2. The shared server 2 (information processing apparatus) is an example of an external apparatus to control the transmission/reception of images in a case where a plurality of HMDs1 share images. The HMD1 may share images with another HMD (external apparatus) by directly transmitting/receiving images.

The HMD1 includes an arithmetic device 101, an image capturing device 102, a primary storage device 103, a detecting device 104, a communication device 105, a display unit 106 and an operation unit 107. The composing elements of the HMD1 are interconnected via a bus 108.

The arithmetic device 101 is a central processing unit (CPU), for example, and controls the HMD1 in general. The image capturing device 102 corresponds to the imaging devices 14a and 14b in FIG. 1, and captures images of the visual field region of the user wearing the HMD1. The image capturing device 102 includes an image pickup element, such as a lens, a CCD or a CMOS sensor, and generates image data capturing the target subject.

The primary storage device 103 is a dynamic random access memory (DRAM), for example. The primary storage device 103 temporarily stores the images captured by the image capturing device 102 and images acquired from the external shared server 2.

The detecting device 104 analyzes an image stored in the primary storage device 103, and determines whether a target subject is included in the image, for example. The target subject is a subject that the user set in advance. The target subject may be changed by the user operation during image capture. Further, the detecting device 104 can also detect the orientation, size, and the like of the target subject.

The communication device 105 can communicate with other apparatuses using such communication standards as Wi-Fi and/or Bluetooth® low energy (BLE). For example, the communication device 105 can communicate with the external shared server 2 via a communication device 205. The communication device 105 transfers the images captured by the image capturing device 102 to the shared server 2.

The arithmetic device 101 acquires images related to the target subject from the external shared server 2, in accordance with the detection result by the detecting device 104, via the communication device 105. For example, in a case where the target subject is not detected in the images captured by the HMD1, the arithmetic device 101 acquires images from the shared server 2. Furthermore, in a case where the target subject facing the front is not detected, or in a case where the size (area) of the detected target subject is a predetermined threshold or less, the communication device 105 acquires images from the shared server 2.

The display unit 106 displays images captured by the image capturing device 102 and images acquired from the external shared server 2. The display unit 106 corresponds to the display unit 11a and the display unit 11b in FIG. 1. The operation unit 107 receives the operation instruction from the user via a button operation, voice or the like.

The shared server 2 includes an arithmetic device 201, a primary storage device 202, a secondary storage device 203, a detecting device 204 and the communication device 205. The composing elements of the shared server 2 are interconnected via a bus 208. The arithmetic device 201 is a CPU, for example, and controls the shared server 2 in general.

The primary storage device 202 is a DRAM, for example, and temporarily stores the images received from the HMD1 and images read from the secondary storage device 203. The secondary storage device 203 is a flash memory, for example, and records the images received from the HMD1, and the like.

The detecting device 204 analyzes an image, which is read from the secondary storage device 203, in the primary storage device 202, and detects a subject. Then the detecting device 204 acquires information on the subject, such as the orientation and size of the subject. Out of the detected subjects, the detecting device 204 attaches a same tag to a same subject, and stores the tagged subjects in the secondary storage device 203. Further, the detecting device 204 links a detected subject and an image which includes this subject, and stores this linked data in the secondary storage device 203.

The communication device 205 can communicate with other apparatuses using such communication standards as Wi-Fi and/or BLE. For example, the communication device 205 can communicate with the HMD1 via the communication device 105. The communication device 205 sends the video, in which the target subject was detected in the HMD1, to this HMD1.

Figure 3:
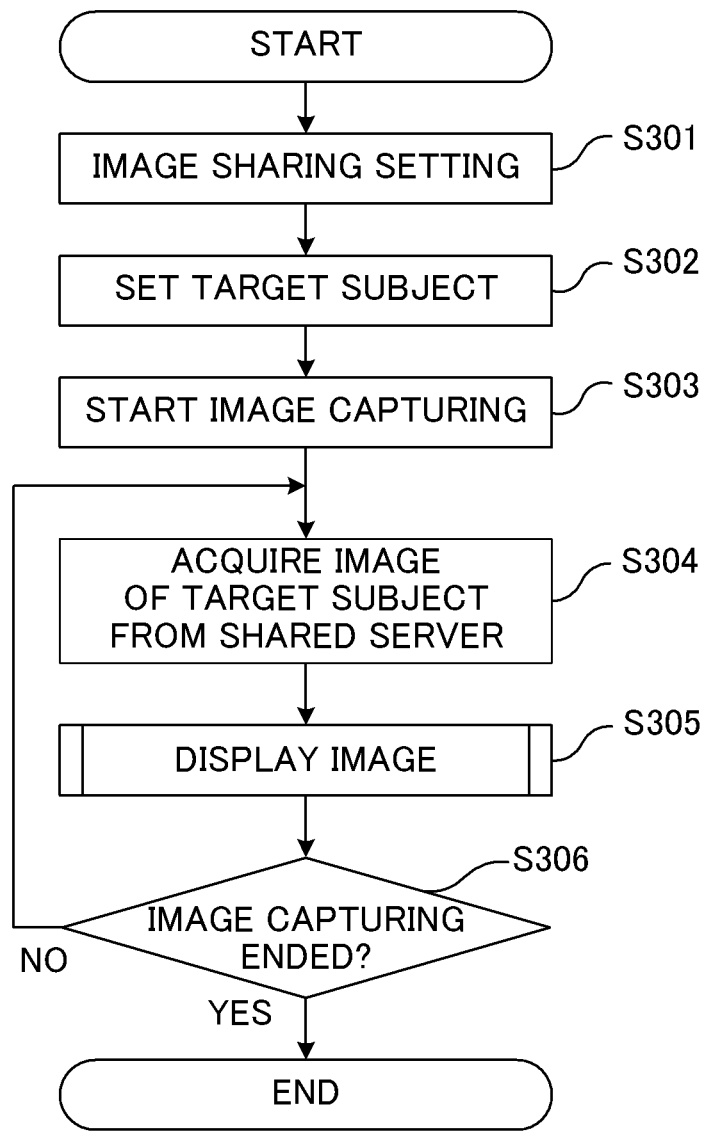
FIG. 3 is a flow chart exemplifying image sharing processing.

Image sharing processing: The image sharing processing will be described with reference to FIG. 3. The image sharing processing is a control flow of the HMD1 in a case where the user wearing the HMD1 shares the images with other users waring an HMD1 in real-time, while watching an event or the like.

In S301, the arithmetic device 101 sets whether images are shared with other HMDs1, based on the user operation performed on the operation unit 107. The user may set to share images in advance, before watching an event, or the like, and may change the setting for sharing while watching the event, or the like.

Figure 4:
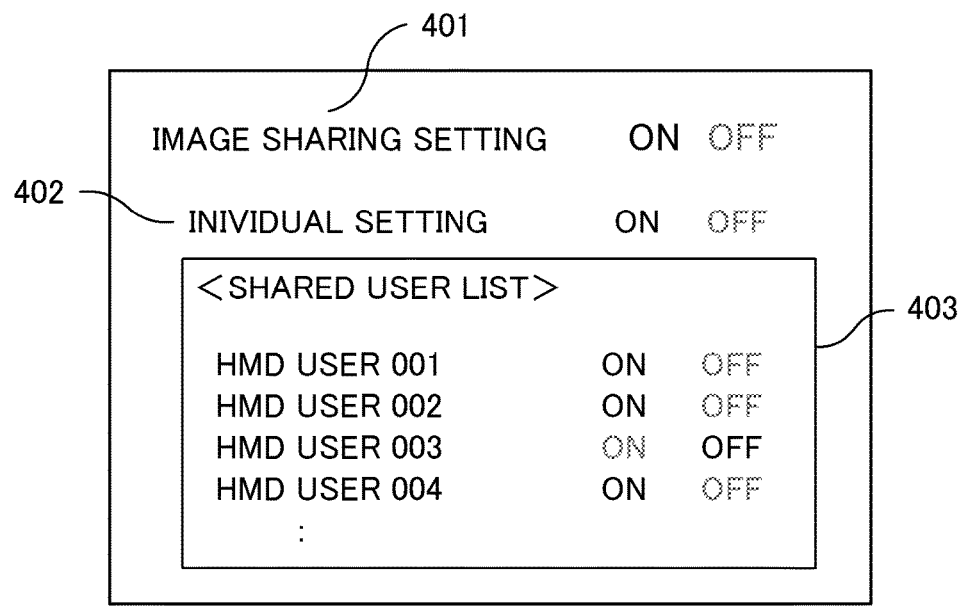
FIG. 4 is a diagram exemplifying an image sharing setting screen.

A specific setting method to share images will be described with reference to FIG. 4. FIG. 4 is a diagram exemplifying an image sharing setting screen. The image sharing setting screen is displayed on the display unit 106 of the HMD1. The user can perform this operation on the image sharing setting screen via the operation unit 107.

In the example in FIG. 4, whether or not the images are shared with HMDs1 worn by other users can be set by setting "image sharing setting 401" to ON or OFF. In the case where "individual setting 402" is set to OFF, the user can set to share images with all other HMDs1 with which the images can be shared. The HMDs1 with which the images can be shared are HMDS1 that can directly communicate with the HMD1 worn by the user or via the shared server 2.

In the case where "individual setting 402" is set to ON, on the other hand, the user can set to share an individual image with an HMD1 of a user indicated in the shared user list 403.

The shared user list 403 indicates HMDs1 with which the images can be shared with the HMD1 worn by the user at an event site, or the like.

In S302, the arithmetic device 101 sets a target subject based on the user operation performed on the operation unit 107. The target subject is a subject that the user wearing the HMD1 primarily wants to watch at an event, or the like. For example, in a case of an athletic meet, the target subject is a student who is playing (child of the user), in a case of a concert, the target subject is a favorite singer, and in a case of a car race, the target subject is a car of a team the user supports. The target subject may be set in advance before watching the event, or may be changed while watching the event.

Figure 5:
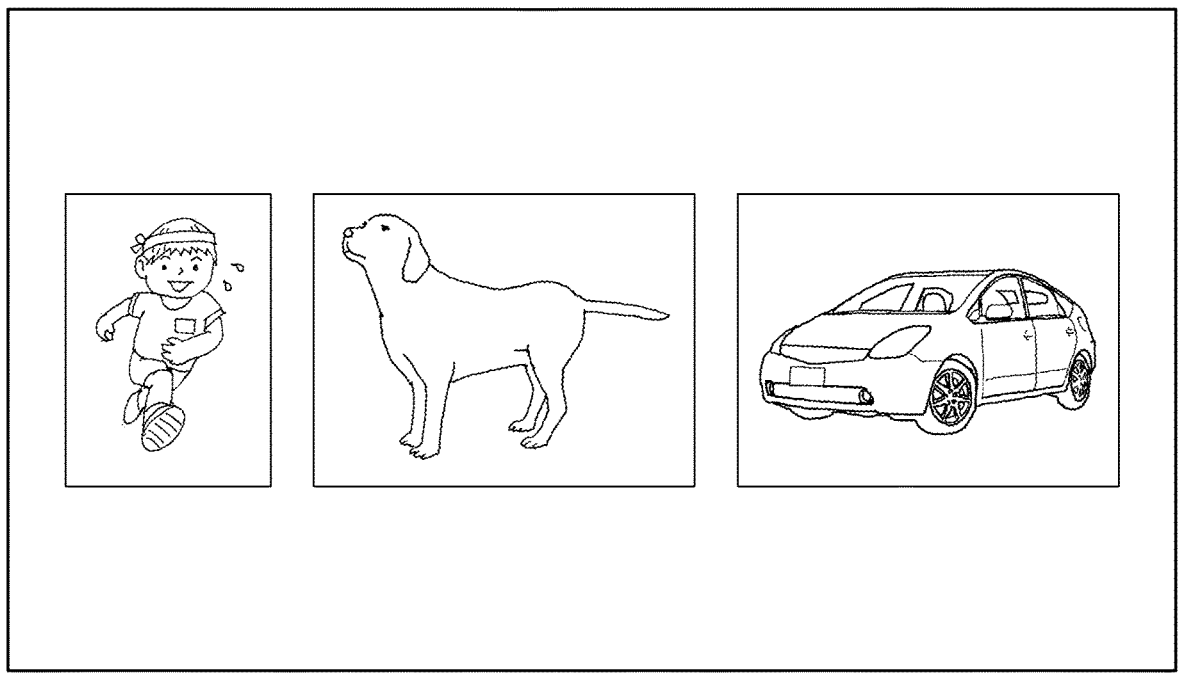
FIG. 5 is a diagram exemplifying a setting screen of a target subject.

Setting of a target subject will be described with reference to FIG. 5. FIG. 5 is a diagram exemplifying a setting screen of the target subject. The arithmetic device 101 displays predetermined subject images on the display unit 106, and registers a subject selected by the user as the target subjects. The target subject is not limited to an individual, but may be an animal, a car or the like.

The predetermined subject images, that is, the subject images displayed as selection candidates on the setting screen of the target subject, may be a subject detected from the images of the HMD1, for example. Further, the arithmetic device 101 may receive information on the subjects detected from images of other HMDs1, or images recorded in the shared server 2, and displaying the received subject images as the selection candidates.

In S303, the arithmetic device 101 starts capturing images using the image capturing device 102 when the user starts watching the event. For example, the arithmetic device 101 determines the start of watching the event when the user turns the power of the HMD1 ON, or performs an operation to start capturing images.

The arithmetic device 101 transfers the captured images to the shared server 2 at will via the communication device 105. The arithmetic device 101 may send the information on the target subject, which was set in S302, to the shared server 2 along with the images.

In the shared server 2, the detecting device 204 detects subjects in the images transferred from the HMD1. The detecting device 204 also recognizes the orientation and size of each subject detected in the images. The detecting device 204 stores image data on the subjects and information on subjects, including the orientation and size of each subject, in the secondary storage device 203. A tag, to identify the subject, is attached to the information on each subject, and this tagged information is recorded in the secondary storage device 203. The shared server 2 also stores images captured by other HMDs1 in the secondary storage device 203 in the same manner.

A same tag is attached to same subjects detected by a plurality of HMDs1. It can be determined whether or not the subjects are the same using a known technique, such as Re-Identification (Re-ID), which is a technique to identify a same person.

In S304, the arithmetic device 101 acquires the images related to the target subject, which was set in S302, from the shared server 2. The images related to the target subject are images in which the target subject is imaged (captured) or images in which the front face of the target subject is captured.

The arithmetic device 201 of the shared server 2 acquires images, in which the target subject is captured, from the images stored in the primary storage device 202 or the secondary storage device 203. The arithmetic device 201 sends the images, which were acquired via the communication device 205, to the HMD1.

In a case where there are a plurality of images in which the target subject is captured, the arithmetic device 201 acquires an image, in which the front face of the captured target image (e.g. face on the case of a person) is larger, with priority. Further, the arithmetic device 201 may regard a most recently acquired image (e.g. within 1 second) as the acquisition target, considering real-time performance.

The shared server 2 may send the HMD1 the images captured by other HMDs1 which are set to share images, regardless whether the target subject is captured in the images. In this case, whether or not the target subject is captured in the images may be determined by the HMD1 which received the images captured by the other HMDs1 via the shared server 2.

Figure 6:
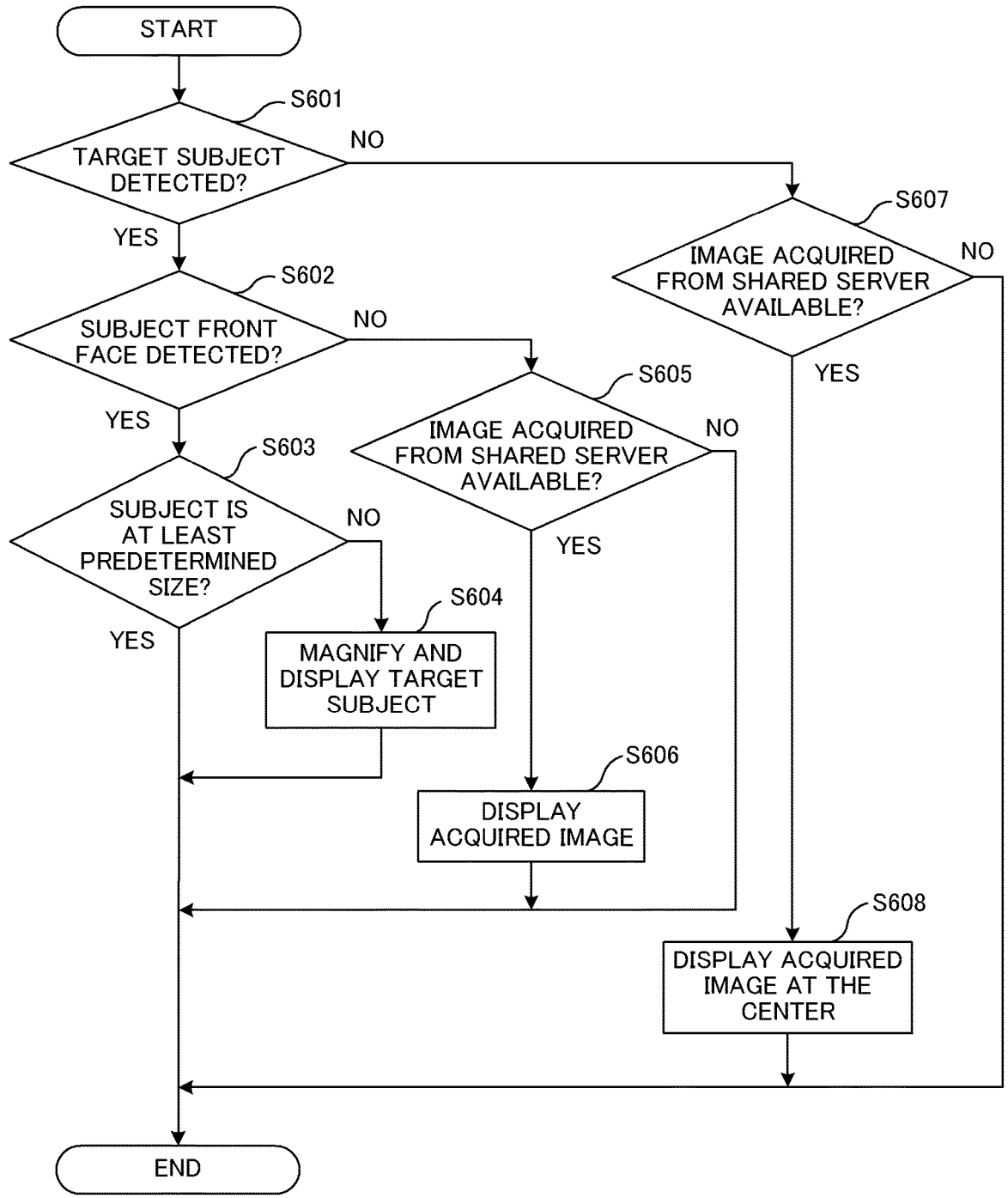
FIG. 6 is a flow chart exemplifying image display control processing.

In S305, the arithmetic device 101 of the HMD1 displays the images acquired from the shared server 2 on the display unit 106 based on the detection result of the target subject. In other words, the arithmetic device 101 displays the images acquired from the shared server 2 depending on whether or not the target subject is detected, or according to the state of the detected target subject, for example. The display control processing of images acquired from the shared server 2 will be described with reference to FIG. 6. FIG. 6 is a flow chart exemplifying the image display control processing.

In S601, the arithmetic device 101 reads the images captured by the image capturing device 102 from the primary storage device 103, and determines whether the detecting device 104 detected the target subject in the images. In a case where the field-of-view of an image captured by the image capturing device 102 is wider than the view angle of the user, the detecting device 104 may perform the detecting processing limited to the visual field region in the image capturing region.

Processing advances to S602 if the detecting device 104 detects the target subject in the captured images. If the detecting device 104 does not detect the target subject in the images, on the other hand, processing advances to S608. The arithmetic device 101 may advance the processing to S608 in the case where the target subject is continuously undetected for at least a predetermined time.

In S602, the arithmetic device 101 determines whether the detecting device 104 detects the subject front face of the target subject. Processing advances to S603 if the detecting device 104 detects the subject front face. If the detecting device 104 does not detect the subject front face, on the other hand, processing advances to S605.

In S603, the arithmetic device 101 determines whether the image of the target subject captured by the image capturing device 102 has at least a predetermined size. In the case where the image of the target subject has at least a predetermined size, the user wearing the HMD1 can sufficiently recognize the target subject with their naked eyes (see-through). In the state where the user can recognize the target subject, the arithmetic device 101 does not display images acquired from the shared server 2, and ends the processing in FIG. 6. The processing advances to S306 in FIG. 3, where end determination is performed.

Processing advances to S604 if the size of the image of the target subject is less than the predetermined size in S603. If the size of the image of the target subject is less than the predetermined size, the arithmetic device 101 may advance to S605 and display images acquired from the shared server 2 on the display unit 106, just like the case where the detecting device 104 does not detect the subject front face in S602.

In S604, the arithmetic device 101 extracts a region capturing the target subject from the image captured by the image capturing device 102, and displays a magnified image of the extracted image on the display unit 106. The arithmetic device 101 displays the magnified image at a position which does not overlap with the target subject detected in the image captured by the image capturing device 102.

Figure 7:
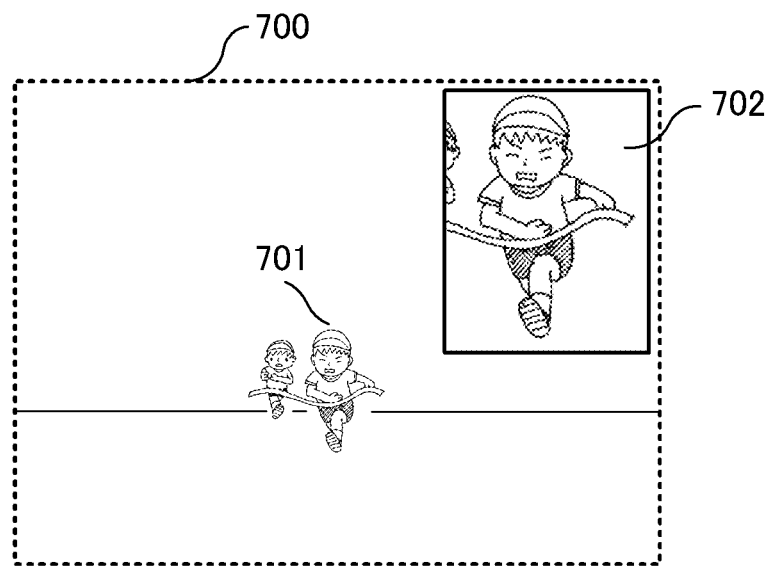
FIG. 7 is a diagram indicating a display example of a magnified image of an image captured by the HMD.

FIG. 7 is a diagram indicating a display example of a magnified image of an image captured by the HMD1. The dotted-line frame in FIG. 7 indicates a display region 700 which is seen through the frame in the display unit 106 of the HMD1. The rectangular frame displayed at the upper right corner of the display region 700 indicates a magnified image display region 702, to display a magnified image of the target subject displayed in the display region 700. The target subject is magnified to a size that can be confined to the magnified image display region 702, and is displayed in this state. Then processing advances to the end determination in S306 in FIG. 3.

The subject front face of the target subject is not detected in the image captured by the image capturing device 102, hence in S605, the arithmetic device 101 determines whether an image capturing target subject exists in the images acquired from the shared server 2.

Processing advances to S606 if an image capturing the target subject exists. If an image capturing the target subject does not exist, on the other hand, the arithmetic device 101 ends the processing in FIG. 6, without displaying the images acquired from the shared server 2. Then processing advances to the end determination in S306 in FIG. 3.

In S606, the arithmetic device 101 displays the images acquired from the shared server 2 on the display unit 106. The arithmetic device 101 displays the images acquired from the shared server 2 at such a position as the peripheral region of the display unit 106, so as not to overlap with the target subject seen in the see-through region.

Figure 8:
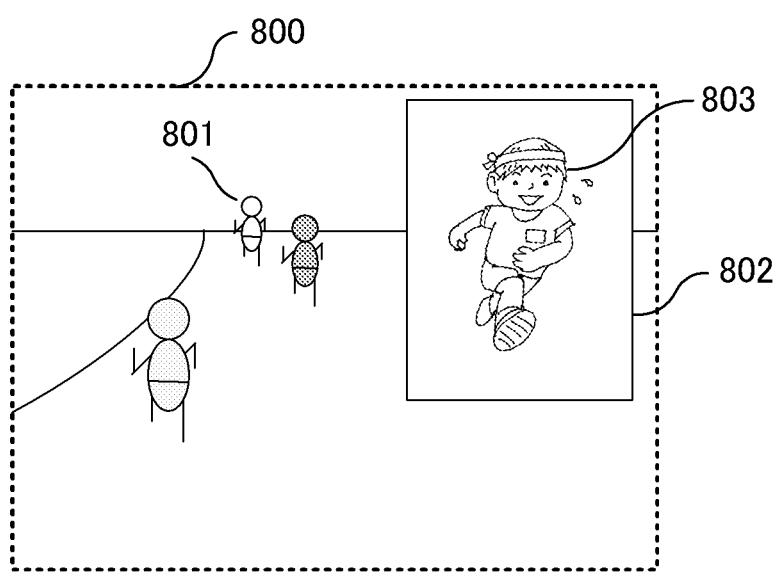
FIG. 8 is a diagram indicating a display example of an image acquired from the shared server.

FIG. 8 is a diagram indicating a display example of an image acquired from the shared server 2. Just like FIG. 7, the dotted-line frame in FIG. 8 indicates a display region 800 which is seen through the frame in the display unit 106 of the HMD1. In the display region 800, the target subject 801 is captured in the state of facing backward. The rectangular frame displayed at the upper right corner of the display region 800 indicates a shared image display region 802, to display an image capturing the target subject 803 acquired from the shared server 2.

The arithmetic device 101 may magnify a region capturing the target subject 803 in the image acquired from the shared server 2, just like S604, and display the magnified image in the shared image display region 802. The arithmetic device 101 may move the display position of the shared image display region 802 horizontally or vertically in accordance with the detected position of the target subject 801, so that the shared image display region 802 does not overlap with the target subject 801 in the region where the shared image display region 802 is seen through. Furthermore, the arithmetic device 101 may determine or change the display size of the shared image display region 802 in accordance with the size of the target subject 801 detected in the see-through region.

The target subject is not detected in the image captured by the image capturing device 102, hence in S607, the arithmetic device 101 determines whether an image capturing the target subject exists in the images acquired from the shared server 2.

Processing advances to S608 if an image capturing the target subject exists. If an image capturing the target subject does not exist, on the other hand, the arithmetic device 101 ends the processing in FIG. 6, without displaying the images acquired from the shared server 2. Then processing advances to the end determination in S306 in FIG. 3.

Figure 9:
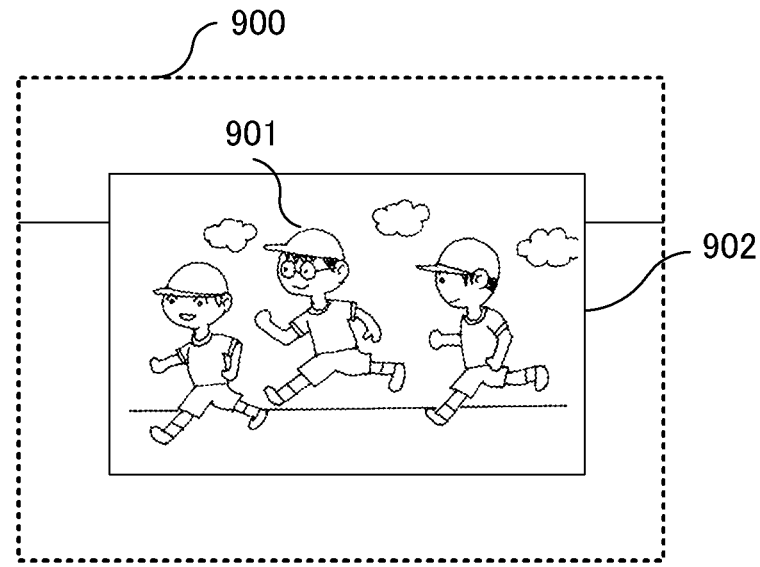
FIG. 9 is a diagram indicating an example of an image display in a case where a target subject is not detected in a see-through region.

In S608, the arithmetic device 101 displays the image acquired from the shared server 2 at the center of the display unit 106. FIG. 9 is a diagram indicating an example of an image display in a case where the target subject is not detected in a see-through region. Just like FIG. 7, the dotted-line frame in FIG. 9 indicates the display region 900 which is seen through the frame in the display unit 106 of the HMD1.

The rectangular frame displayed at the center of the display region 900 indicates a shared image display region 902 to display an image capturing the target subject 901 acquired from the shared server 2. Just like S604, the arithmetic device 101 may magnify or partially extract a region where the target subject 901 is captured from the image acquired by the shared server 2, and display the image in this state in the shared image display region 902.

The display position of the shared image display region 902 is not limited to the center position, but may be a position on the right side or the left side in the display region 900. Further, in the case where the target subject is detected in the see-through display region 900, the arithmetic device 101 may reduce the size of the shared image display region 902, and may move it to a position that does not overlap with the target subject.

Referring back to S306 in FIG. 3, the arithmetic device 101 determines whether the image capturing ended. The arithmetic device 101 determines that the image capturing ended when the operation to end the image capturing or the operation to shut the power OFF, which the user performed on the operation unit 107, is received. The image sharing processing in FIG. 3 ends if the image capturing ended. If the image capturing is not ended, on the other hand, processing returns to S304.

The processing steps S304 and S305 are repeated until the user ends watching the event and instructs the end of image capturing. Thereby the user wearing the HMD1 can share the images of the target subject captured by other HMDs1 in real-time in a case where the target subject cannot be sufficiently recognized by see-through display.

The input operation, such as instructing image capturing and performing shared setting, can be performed only once before the start of watching an event. By performing shared setting for images in advance, the user can be free from performing the operation to share images with other HMDs1 while watching the event, and can focus on the event without distraction The image display processing in FIG. 6 may be performed for each frame, or may be performed with intervals of about 1 to several seconds. The information on a subject, such as the position or the size of the subject, is not limited to being evaluated for each frame, but may be evaluated based on an average value acquired from a plurality of frames. Then even if the target subject rapidly moves around the event site, such as the case of a basketball game, the arithmetic device 101 can smoothly switch the image display. The smooth switching of the image display allows the user to focus on watching the event.

In the above description, the images shared by the shared server 2 are images captured by other HMDs1, but the present invention is not limited to this. The images that the HMDs1 can share may be images captured by a stationary camera installed at the event site, or images captured by a professional photographer using a hand held camera.

Embodiment 2

In Embodiment 1, the user sets the target subject in advance before watching an event, or changes the target subject while watching the event. In Embodiment 2, on the other hand, the target subject is automatically switched based on the line-of-sight position of the user. The configurations of the HMD1 and the shared server 2 are the same as the configurations described in Embodiment 1 with reference to FIG. 1 and FIG. 2, hence description thereof is omitted.

In the case where the user wants to change the target subject while watching an event, performing the setting of the target subject again is troublesome. In Embodiment 2, the HMD1 detects the line-of-sight of the user and switches the target subject to the subject to which the line-of-sight of the user is directed. Therefore the operation load on the user to switch the target subject is reduced.

The method of detecting the line-of-sight is, for example, a corneal reflex method which is commonly used. The corneal reflex method is a method of emitting infrared light to an eye ball of the user, and detecting a state of the eye ball (direction of line-of-sight) based on the difference of reflectance between the cornea and the pupil. The line-of-sight moving information (the time and position of the visual field the user was looking at) can be acquired from the detected line-of-sight direction and the images captured by the HMD.

Figure 10:
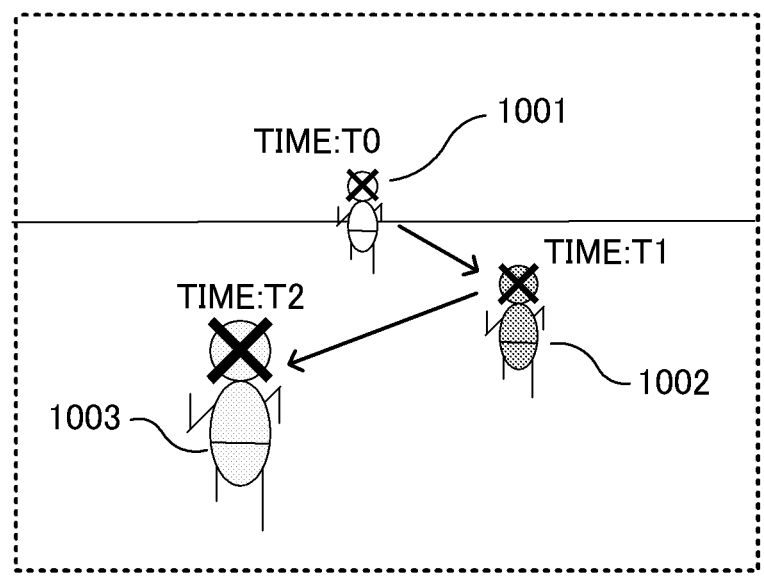
FIG. 10 is a diagram for describing the line-of-sight moving information.

The line-of-sight moving information will be described with reference to FIG. 10. FIG. 10 is a scene where three students are running in a foot race. The line-of-sight positions of the user at time T0, time T1 and time T2 are indicated by X. At time T0, the user is focusing on student 1001. The line-of-sight of the user moves to student 1002 at time T1, and to student 1003 at time T3.

For example, in a case where it is detected that the line-of-sight of the user remains focused on a specific subject for at least a predetermined period, the arithmetic device 101 of the HMD1 switches the target subject to the subject which the line-of-sight of the user remains focused on. Before switching the target subject, the arithmetic device 101 notifies the user that the target subject is changed.

Figure 11:
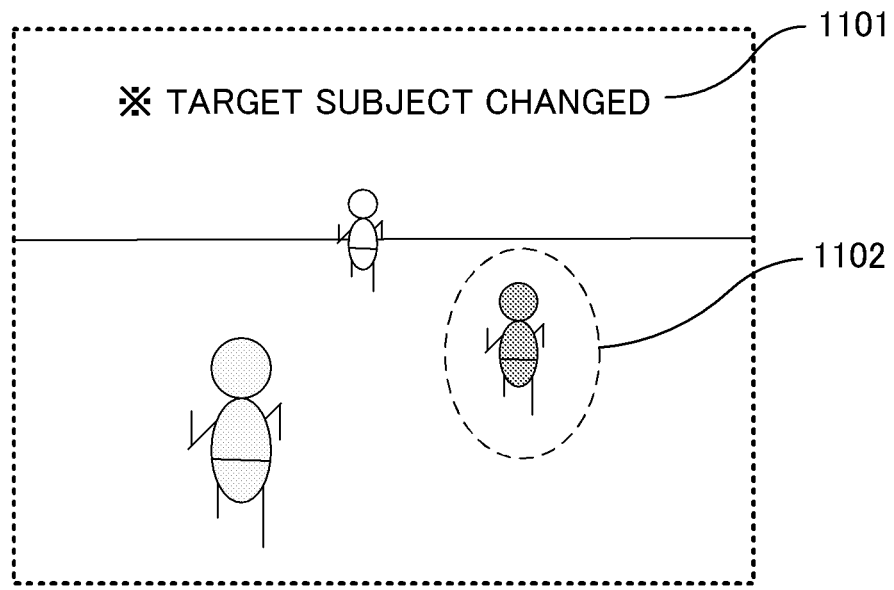
FIG. 11 is a diagram indicting an example of notifying that a target subject changed.

FIG. 11 is a diagram indicating an example of notifying that a target subject has been changed. The arithmetic device 101 displays a message 1101 notifying that the target subject has been changed, and also displays a frame 1102 that encloses the target subject after the change.

FIG. 11 indicates an example of notifying the change of the target subject, but the present invention is not limited to a notification. The arithmetic device 101 may display a confirmation message so that the user can select whether or not the target subject changed. In this case, the arithmetic device 101 switches the target subject when the user accepts the change of the target subject. If the user does not accept the change of the target subject, the arithmetic device 101 continues the image sharing processing for the current target subject without changing the target subject.

In Embodiment 2, the HMD1 detects the line-of-sight of the user and changes the target subject based on the line-of-sight position of the user. Thereby the arithmetic device 101 can easily switch the target subject, even if the user does not perform any additional operation.

Embodiment 3

In Embodiment 1, the display position and the display size of the image acquired from the shared server 2 are determined based on the position and the size of the target subject detected in the see-through region.

In Embodiment 3, on the other hand, a virtual monitor is displayed in the image capturing range of the image capturing device 102, and an image acquired from the shared server 2 is projected onto the virtual monitor. For example, the HMD1 can display the virtual monitor at a fixed position of the event site (actual space). The configurations of the HMD1 and the shared server 2 are the same as the configurations described in Embodiment 1 with reference to FIG. 1 and FIG. 2, hence description thereof is omitted.

In a situation where the target subject rapidly moves, the display position and the display size of the image acquired from the shared server 2 frequently change, which may interrupt watching the event in the see-through region. In Embodiment 3, the output destinations of the image acquired from the shared server 2 are fixed on the virtual monitor that is set at a predetermine position in the actual space, thereby the user can relax and watch the event without being interrupted by the display of the shared images.

Figure 12:
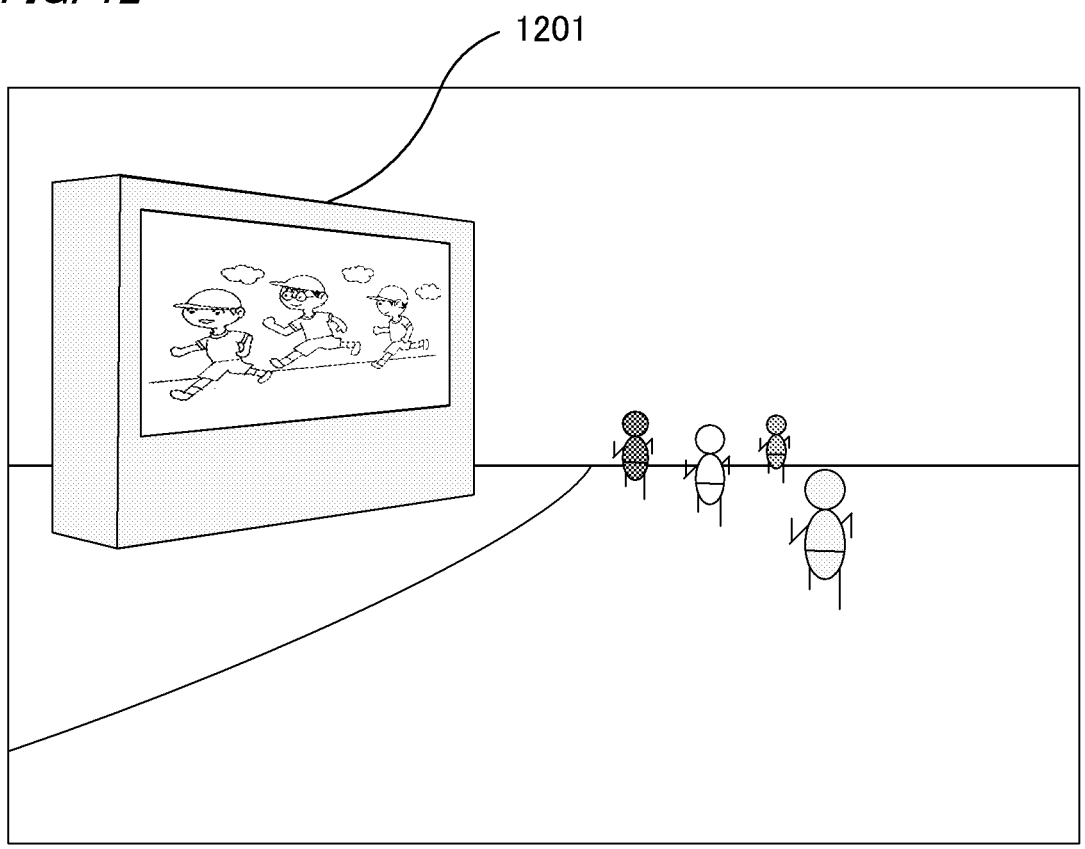
FIG. 12 is a diagram indicating a display example of a virtual monitor.

FIG. 12 is a diagram indicating a display example of a virtual monitor. In the example of FIG. 12, the arithmetic device 101 displays as if a large virtual monitor were installed in an open space (inner side of a track) on the ground where a foot race is taking place. For example, the display position of the virtual monitor is set in an open space for each event subject to the layout of the event site. When it is detected that the display position of the virtual monitor enters the field-of-view of the user, the HMD1 displays the virtual monitor on the display unit 106.

The virtual monitor may be disposed to face the front face of the user, or may be displayed diagonally with respect to the user in accordance with the installation position. In the case where the virtual monitor is displayed diagonally with respect to the user, the arithmetic device 101 performs projective transformation of the image displayed on the virtual monitor in accordance with the installation angle of the monitor with respect to the HMD1 worn by the user. The user can watch both the image of the target subject which is naturally displayed on the virtual monitor by projective transformation, and the see-through image at the same time.

Embodiment 4

In each embodiment described above, the HMD1 shares images in real-time. Embodiment 4, on the other hand, discloses a method where the user estimates a missed period (scene) in real-time based on the detection result of the target subject and the line-of-sight moving information of the user, and a reproduced image that is reproduced (replayed) in the HMD1 thereafter is generated. When the image is later reproduced, the HMD1 reproduces images acquired from the shared server 2 for the scene the user missed. The configurations of the HMD1 and the shared server 2 are the same as the configuration described in Embodiment 1 with reference to FIG. 1 and FIG. 2, hence description thereof is omitted.

FIG. 13 is a table for describing the estimation of a missed period. In order to estimate a missed period, the arithmetic device 101 records information on the target subject at each timing while watching the event. The target subject may be set by the user in advance, as described in Embodiment 1, or may be set based on the line-of-sight information of the user, as described in Embodiment 2.

The information recorded in each scene is: "A: time", "B: detection result of target subject", "C: face detection result of target subject" and "D: size determination result of target subject". "B: detection result of target subject" is information on whether the target subject is detected in the see-through region. "C: face detection result of target subject" is information on whether the face (front face) of the target subject is detected. "D: size determination result of target subject" is information on whether the size of the face of the target subject is at least a predetermined size.

In the example in FIG. 13, the target subject is not detected in the period from time T5 to T7, hence "B: detection result of the target subject", "C: face detection result of the target subject" and "D: size determination result of the target subject" are NG.

At time T8, the target subject is detected, but the face of the target subject (front face of the target subject) is not detected, hence "C: face detection result of the target subject" and "D: size determination result of the target subject" are NG. At time T9, the face of the target subject is detected, but the size of the target subject is less than a predetermined size, hence "D: size determination result of the target subject" is NG.

In the case where any one of "B: detection result of the target subject", "C: face detection result of the target subject", and "D: size determination result of target subject" is NG, the arithmetic device 101 reproduces images acquired from the shared server 2. In the example in FIG. 13, in the period from time T0 to time T4 and at time T10, the arithmetic device 101 reproduces the image captured using the HMD1 worn by the user. In the period from time T5 to time T9, the arithmetic device 101 reproduces the images acquired from the shared server 2.

Thereby based on the detection result of the target subject, the arithmetic device 101 can generate a digest video (reproduced image) combining the images captured by the HMD1 and the images acquired from the shared server 2, based on the detection result of the target subject. Therefore even if the target subject is missed in real-time, the user wearing the HMD1 can watch the digest video that includes images of the subject which were captured during the missed period.

Each of the above embodiments merely exemplifies a configuration example of the present invention. The present invention is not limited to the specific embodiments described above, but may be combined or modified in various ways within the scope of the technical spirit thereof.

According to the present disclosure, the load on the user to share images from various viewpoints in real-time can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-050040, filed on Mar. 24, 2021, which is hereby incorporated by reference herein in its entirety.

What is claimed is:

1. A display device comprising:
an imaging device; and
at least one processor and/or at least one circuit, the at least one processor and/or at least one circuit being configured to act as a plurality of units comprising: (1) a detecting unit that detects a target subject in images captured by the imaging device; (2) an acquiring unit that acquires, from an external apparatus, an image capturing the target subject; and (3) a display control unit that controls display, on an image of the images captured by the imaging device, of the image acquired from the external apparatus,
wherein in a case where the target subject is detected but the target subject facing a predetermined direction is not detected by the detecting unit, (1) the acquiring unit acquires the image capturing the target subject facing the predetermined direction and (2) the display control unit controls display of the image capturing the target subject facing the predetermined direction, and
wherein the display control unit (1) controls display of the image acquired by the acquiring unit in a case where a size of the target subject in the image captured by the imaging device becomes smaller than a predetermined size, (2) determines a size of an area to display the image acquired by the acquiring unit, based on the size of the target subject in the image captured by the imaging device, so that the image acquired by the acquiring unit does not overlap with the target subject, and (3) controls the image captured by the imaging device and the image acquired by the acquiring unit to be displayed together.

2. The display device according to claim 1, wherein the display control unit controls display of an image capturing a larger front face of the target subject with priority out of the images capturing the target subject.

3. The display device according to claim 1, wherein in a case where the target subject is not captured in the images captured by the imaging device, the display control unit controls display of the image acquired by the acquiring unit.

4. The display device according to claim 1, wherein in a case where the front face of the target subject is no longer detected by the detecting unit, the display control unit controls display of the image acquired by the acquiring unit.

5. The display device according to claim 1, wherein in a case where the size of the target subject in the image captured by the imaging device becomes smaller than a predetermined size, the display control unit either (a) controls display of the image acquired by the acquiring unit or (b) magnifies an image of a region capturing the target subject cut out from the image captured by the imaging device, and controls display of the magnified image.

6. The display device according to claim 1, wherein the display control unit (1) controls display of the image acquired from the external apparatus in a case where a size of the target subject in the image captured by the imaging device becomes smaller than a predetermined size, (2) determines the display position of the image acquired by the acquiring unit, based on the position of the target subject in the image captured by the imaging device, so that the image acquired by the acquiring unit does not overlap with the target subject, and (3) controls the image captured by the imaging device and the image acquired by the acquiring unit to be displayed together.

7. The display device according to claim 1, wherein the target subject is set by a user in advance.

8. The display device according to claim 1, wherein the detecting unit changes the target subject based on the line-of-sight position of a user.

9. The display device according to claim 1, wherein the display control unit controls display of a virtual monitor within an image capturing range of the imaging device, and controls display of the image acquired by the acquiring unit on the virtual monitor, and
wherein the image displayed on the virtual monitor includes the target subject.

10. The display device according to claim 1, wherein the at least one processor and/or the at least one circuit further act as an estimating unit that estimates a missed period when a user missed the target subject based on the detection result of the target subject and line-of-sight moving information of the user, and
wherein the display control unit generates a reproduced video of the target subject during a period including the missed period, using images captured by the imaging device and an image captured during the missed period among the images acquired from the external apparatus.

11. The display device according to claim 1, wherein the at least one processor and/or the at least one circuit further act as a transmitting control unit that performs control to transmit an image captured by the imaging device to the external apparatus.

12. The display device according to claim 1, wherein the at least one processor and/or the at least one circuit are further configured to act as an estimating unit that estimates a missed period when a user missed the target subject, and
wherein the display control unit generates a reproduced video of the target subject during a period including the missed period, using images captured by the imaging device while the target subject is detected and an image captured during the missed period among images acquired from the external apparatus.

13. The display device according to claim 1, wherein the acquiring unit acquires the image capturing the target subject from the external apparatus in real-time, and
wherein the display control unit controls display of the image acquired from the external apparatus in real-time.

14. The display device according to claim 1, wherein the predetermined direction is a front direction.

15. The display device according to claim 1, wherein the display control unit controls the image captured by the imaging device and the image acquired from the external apparatus to be displayed together.

16. A display control system including:
an information processing apparatus; and
the display device according to claim 1,
wherein the information processing apparatus comprises at least one processor and/or at least one circuit, the at least one processor and/or at least one circuit being configured to act as a plurality of units comprising: (1) a receiving control unit that performs control to receive images captured by the imaging device from a plurality of the display devices; (2) an acquiring unit that detects a subject from an image received by the receiving control unit and acquires information on the target subject including orientation and size of the target subject; and (3) a transmitting control unit that performs control to transmit, to the display device, an image selected based on the information on the target subject, out of the images in which the target subject is detected in the display device.

17. A method for controlling a display device, the method comprising:
capturing an image;
detecting a target subject in images captured in the capturing;
acquiring an image capturing the target subject from an external apparatus; and
displaying, on the image captured in the capturing, the image acquired from the external apparatus,
wherein in a case where the target subject is detected but the target subject facing a predetermined direction is not detected in the detecting, (1) the image capturing the target subject facing the predetermined direction is acquired in the acquiring, and (2) display of the image capturing the target subject facing the predetermined direction is controlled in the displaying, and
wherein, in the displaying, (1) display of the image acquired in the acquiring is controlled in a case where a size of the target subject in the image captured by the imaging device becomes smaller than a predetermined size, (2) a size of an area to display the image acquired in the acquiring is determined based on the size of the target subject in the image captured by the imaging device, so that the image acquired in the acquiring does not overlap with the target subject, and (3) the image captured by the imaging device and the image acquired in the acquiring are controlled to be displayed together.

18. A non-transitory computer-readable medium that stores a program for causing a computer to execute a method for controlling a display device, the method comprising:
capturing an image;
detecting a target subject in images captured in the capturing;
acquiring an image capturing the target subject from an external apparatus; and
displaying, on the image captured in the capturing, the image acquired from the external apparatus, wherein in a case where the target subject is detected but the target subject facing a predetermined direction is not detected in the detecting, (1) the image capturing the target subject facing the predetermined direction is acquired in the acquiring, and (2) display of the image capturing the target subject facing the predetermined direction is controlled in the displaying, wherein, in the displaying, (1) display of the image acquired in the acquiring is controlled in a case where a size of the target subject in the image captured by the imaging device becomes smaller than a predetermined size, (2) a size of an area to display the image acquired in the acquiring is determined based on the size of the target subject in the image captured by the imaging device, so that the image acquired in the acquiring does not overlap with the target subject, and (3) the image captured by the imaging device and the image acquired in the acquiring are controlled to be displayed together.

* * * * *